United States Patent [19]

Mowill

[11] Patent Number: 4,459,802
[45] Date of Patent: * Jul. 17, 1984

[54] BLEEDOFF OF GAS DIFFUSERS IN FLUID FLOW MACHINES

[75] Inventor: Jan Mowill, Oslo, Norway

[73] Assignee: A/S Kongsberg Vapenfabrikk, Kongsberg, Norway

[*] Notice: The portion of the term of this patent subsequent to Jan. 5, 1999 has been disclaimed.

[21] Appl. No.: 309,239

[22] Filed: Oct. 6, 1981

Related U.S. Application Data

[63] Continuation-in-part of Ser. No. 973,609, Dec. 27, 1978, Pat. No. 4,308,718.

[30] Foreign Application Priority Data

Jan. 2, 1978 [NO] Norway .................................. 780010

[51] Int. Cl.³ .............................................. F02C 7/00
[52] U.S. Cl. ................................... 60/39.02; 60/39.07; 60/39.5; 415/172 R; 415/DIG. 1
[58] Field of Search ................... 60/39.02, 39.5, 39.07; 415/110, 112, 170 R, 170 A, 172 R, 207, 219 B, DIG. 1; 417/78, 84, 89

[56] References Cited

U.S. PATENT DOCUMENTS

| | | | |
|---|---|---|---|
| 3,019,736 | 2/1962 | Stalker | 415/172 R |
| 3,761,205 | 9/1973 | Cronstedt | 417/407 |
| 4,152,092 | 5/1979 | Swearingen | 415/172 R |
| 4,308,718 | 1/1982 | Mowill | 60/39.02 |

FOREIGN PATENT DOCUMENTS 1199042 12/1959 France ................................ 60/39.07

OTHER PUBLICATIONS

Chang, Paul K. *Control of Flow Separation* N.Y., McGraw Hill, 1976, pp. 6, 7 & 159.

*Primary Examiner*—Louis J. Casaregola
*Attorney, Agent, or Firm*—Holman & Stern

[57] ABSTRACT

In a fluid flow machine comprising a compressor including a compressor diffuser and a turbine including an exhaust gas diffuser compressed air from boundary layers or vortex flows in the compressor diffuser, or leakage air from the compressor, is bled off and used as a driving medium for removing exhaust gas from boundary layers or vortex flows in the exhaust gas diffuser. Since the pressure of the exhaust gas to be removed from the exhaust gas diffuser is below the ambient pressure a suction has to be established to remove the desired gas from the boundary layers or vortex flows. This suction is established by an ejector or a pump which is driven by the energy of the compressed air bled from the compressor regions.

6 Claims, 3 Drawing Figures

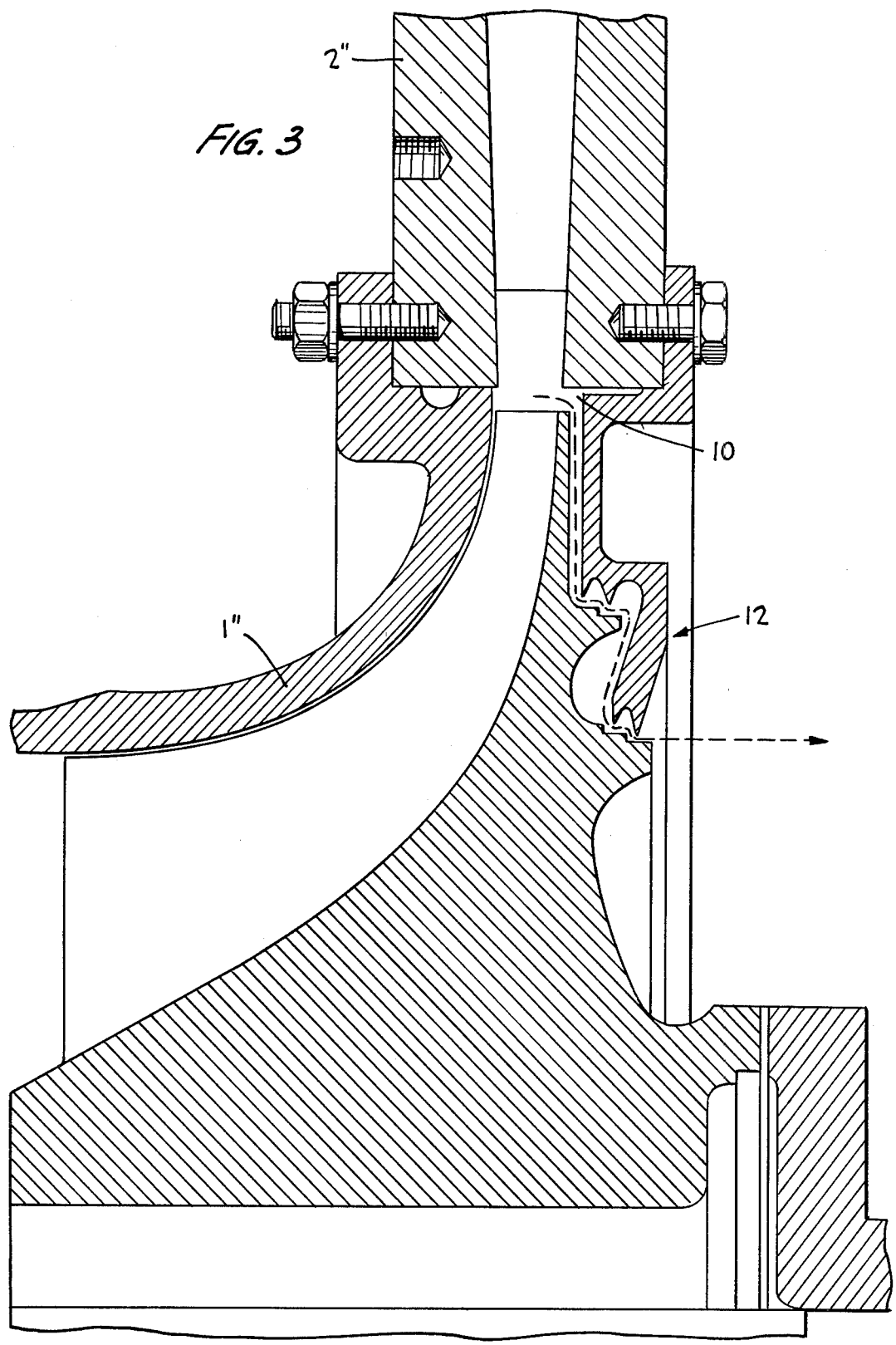

BLEEDOFF OF GAS DIFFUSERS IN FLUID FLOW MACHINES

This application is a continuation-in-part of my prior application Ser. No. 973,609, filed Dec. 27, 1978, now U.S. Pat. No. 4,308,718.

BACKGROUND OF THE INVENTION

1. Field Of The Invention

The present invention relates to a method of stabilizing the flow of working medium in fluid flow machines such as turbochargers and gas turbine engines by bleeding off a part of the working medium from boundary layers or vortex flows in the machine. The invention further relates to turbo-machinery for carrying out the method.

2. Description Of The Prior Art

It is known, such as shown in U.S. Pat. No. 3,856,430 and French Pat. No. 1199042, that the flow pressure losses in diffusers may be reduced by selective bleedoff of parts of the working medium. When working medium such as air with low kinetic energy is bled from a vortex flow in a diffuser, the vortex will be replenished by air of a higher energy level from the mainstream and thus be stabilized. A stepped diffuser (a diffuser in which the flow area abruptly increases to the desired value instead of increasing gradually such as in conical diffusers) with such a stabilized vortex flow may function without detachment of the flow even at very high diffuser area ratios. A bleedoff of working medium may also be used for obtaining a given pressure recovery with a shorter diffuser length, whereby the diffuser will be lighter and probably also cheaper. A bleedoff of boundary layers has a beneficial effect on most types of diffusers, but the effect is especially large in stepped diffusers as indicated above.

BRIEF SUMMARY OF THE INVENTION

However, the utilization of these advantages has been very limited, because bleeding off a part of the working medium constitutes a loss which at least partly offsets the increase of the efficiency due to stabilization of the flow. In addition, pumps or other suction devices must be used when bleeding off working medium from exhaust gas diffusers, since the pressure in such diffusers is lower than the ambient pressure, requiring bleedoff of the working medium by suction, whereas working medium may be removed from the high pressure region, e.g. from a compressor diffuser, simply by tapping.

The object of the present invention is to provide a simple method of and apparatus for effecting the bleedoff of working medium from diffusers in turbo-machinery in such a manner that the total efficiency can be improved to such an extent that a bleedoff of working medium constitutes a more attractive and interesting possibility.

The invention is based upon the recognition that a bleedoff from a high pressure region and a low pressure region may be combined in an advantageous manner to provide a substantially better effect than when the operation of bleeding off working medium from these regions are effected independently of each other. Thus, the bled high pressure air may be used directly to provide a removal of air from the low pressure region. This means that a working medium which it is advantageous to remove from a high pressure region, may be utilized to provide energy for drawing off a working medium which it is advantageous to remove from a low pressure region.

Thus, the invention resides in coupling the operations of bleeding off working medium from two or more regions of the machine, the energy of a working medium bled from a high pressure region being used to remove working medium by suction from a low pressure region, whereby the total efficiency is improved. Typical examples of high pressure regions from which a bleeding of working medium may result in an increased efficiency, are regions of flow detachment or boundary layers in a compressor diffuser. When the fluid flow machine forms a two-stage system being formed by e.g. a turbo-charger or a turboshaft engine, working medium bled from the diffusing portions of a compressor may according to the invention be used to draw off working medium from the diffusing portions of a turbine. Compressor leakage air, such as that leaking through the labyrinth seals of a compressor, may also be used as the bled high pressure medium.

The bled high pressure medium may also be used for other purposes before its energy is utilized to draw off working medium from the exhaust gas diffuser of the turbine. Thus, the medium may be used for cooling of the machinery, whereby heat energy is supplied to the medium, which energy may be utilized in a subsequent expansion process.

Turbo-machinery with which the invention may be carried out, preferably comprises a compressor including a compressor diffuser and a turbine including an exhaust gas diffuser. Such machinery may e.g. be a turbo-charger or a turboshaft engine characterized in that it comprises an energy conversion means which is operated by working medium bled from a boundary layer or a vortex flow in the diffusing portions of the compressor and supplies energy for removing working medium by suction from a boundary layer or a vortex flow in the diffusing portions of the turbine.

The amount of working medium bled from the compressor may be varied in any suitable manner so as to be adapted to the operative conditions of the turbine part of the machinery. For controlling the capacity and the response of a turbo-charger the amount of bled working medium (air) may e.g. be varied instead of or in combination with by-passing the exhaust gases, so-called "waste-gating".

As indicated above, a bleedoff is especially effective in stepped diffusers, since the bleeding may be effected from a single area close to the step in the flow path, and the present invention is therefore especially useful in connection with such diffusers. According to available data a stepped diffuser with bleedoff may provide a pressure recovery of about 90% compared with about 60% for an ordinary linear conical diffuser. A pressure recovery or efficiency of above 60% may also be obtained with conical diffusers without a bleedoff if consisting of a series of coaxially placed diffusers. However, this involves a far more expensive and mechanically complicated design which is seldom used. In order to obtain a pressure recovery of about 90% it may be necessary to bleed off approximately 1-3% of the working medium, but it may also be possible to manage with smaller amounts. However, the energy loss associated with such a bleedoff of working medium can be substantially reduced when a bleedoff from a high pressure region is combined in accordance with the invention with a removal by suction from a low pressure region. The aerodynamic gains may then provide a total improvement of the efficiency in the order of 10%. In the case of a gas turbine this may result in a corresponding reduction of the fuel consumption. The use of stepped diffusers is believed also to provide substantial practical advantages with respect to manufacturing costs. In connection with the high exhaust gas velocities used or planned in modern radial turbines a good exhaust gas diffuser will be of especial significance to the total thermal efficiency. The importance of the invention is believed to be especially great for medium and small turbo-machinery such as turbo-chargers and gas turbines for use in propelling machinery in e.g. automobiles, since the boundary layers in such small machines occupy a comparatively large part of the flow passages, thereby resulting in a rather large reduction of the efficiency. The concurrent bleedoff with internal utilization of the energy in the high pressure medium according to the invention will therefore provide an especially large increase of the efficiency in small machinery, so that the disadvantage of a low efficiency inherent in such small turbo-machinery may be reduced.

The invention will now be further illustrated, reference being had to the drawing.

BRIEF DESCRIPTION OF THE DRAWINGS

FIG. 3 is an enlarged cross-sectional and partly schematic view showing a further embodiment of this invention.

DETAILED DESCRIPTION

Figure 1:
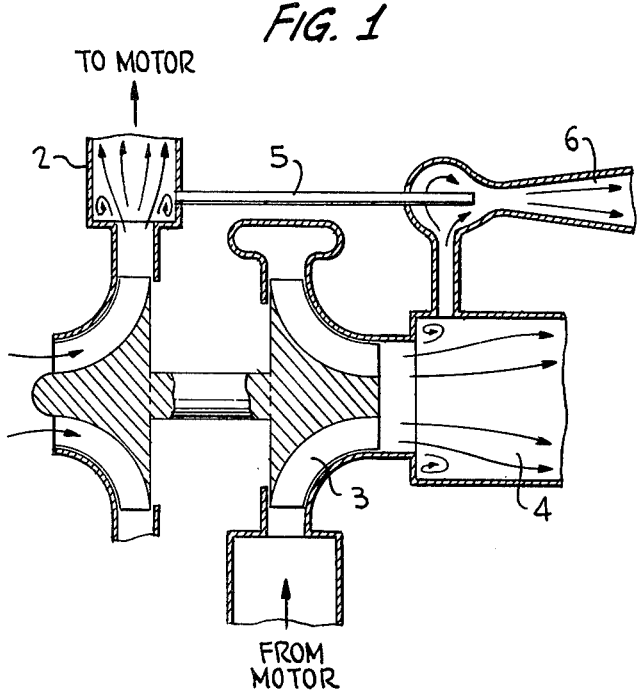
FIG. 1 diagrammatically illustrates a turbo-charger having a stepped diffuser in which a concurrent bleed-off of working medium according to the invention is employed.

In FIG. 1 there is shown a compressor 1 which through a stepped compressor diffuser 2 supplies compressed air to a motor (not illustrated). The exhaust gases from the motor are passed to a turbine 3 having a stepped exhaust gas diffuser 4. The turbine 3 drives the compressor 1. Working medium (air) from the compressor diffuser 2 is bled off through a conduit 5 which leads to an ejector 6 which draws off working medium from the exhaust gas diffuser 4.

Figure 2:
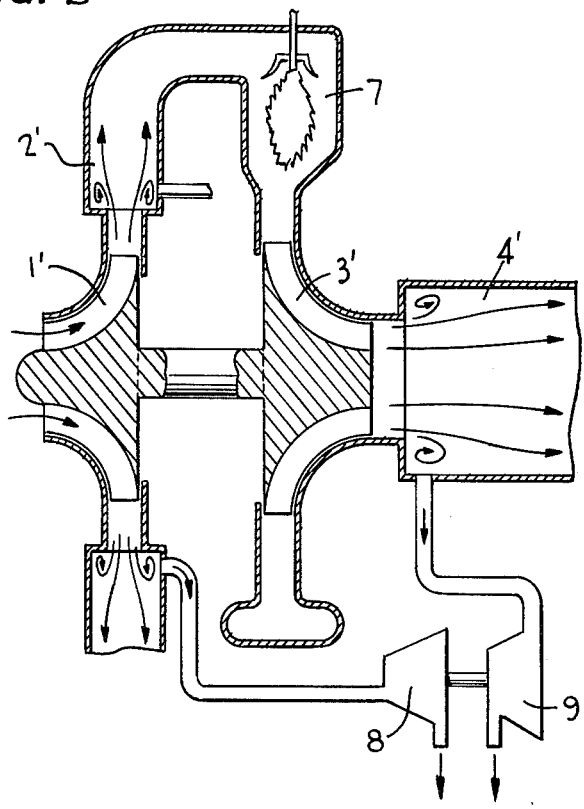
FIG. 2 illustrates a corresponding use of the invention in a gas turbine.

FIG. 2 shows approximately the same in connection with a gas turbine, and corresponding parts in FIG. 2 are therefore designated by the same reference numerals as in FIG. 1 with the addition of a prime. Instead of a motor this embodiment includes a combustion chamber 7. Of course, the turbine 3' generates substantially more energy than the turbine 3 which is only driven by the exhaust gases from the not illustrated motor, and the turbine 3' will therefore in addition to driving the compressor 1' usually also supply energy for operating a further load, e.g. an electric power generator which is not shown. Instead of an ejector 6 the embodiment in FIG. 2 includes an air turbine 8 operating a pump or compressor 9 for removing working medium by suction from the vortex flow in the stepped exhaust diffuser 4'.

The use of an ejector provides the best results when the primary air and the secondary air have approximately the same density. However, by using other solutions than an ejector a better efficiency is usually obtained, but ejectors may still be preferable in connection with small machines, since they have various other advantages such as low costs.

The concurrent bleedoff of working medium according to the invention may also be combined with a cooling of the hot parts of the machinery, the air bled from the high pressure region being used for cooling prior to utilizing the energy in the air in connection with a bleedoff from the exhaust gas diffuser. During cooling heat energy is supplied to the air which will counteract the flow friction losses which usually are larger when the air is used for cooling purposes.

FIG. 3 shows schematically on an enlarged scale a further embodiment of the invention wherein leakage air from a labyrinth seal is utilized as the high pressure medium for pumping subatmosphere pressure air out from the boundary layer in the turbine exhaust diffuser. Leakage of higher than atmospheric pressure air through clearances between rotating and static parts of a turbomachine is unavoidable. At the exit of a centrifugal compressor 0.5% to 2% of the air has normally to be bled from the engine cycle and this represents a performance penalty. For compressors with pressure ratios above about 7:1 this air is too hot to be used as bearing seal air. The present invention uses this "lost" air to control the boundary layer in the turbine exhaust diffusor.

As shown in FIG. 3 air from the exit portion 10 of a compressor 1" before passing to the diffuser 2" leaks through labyrinth seals generally indicated at 12 as shown by the arrows. At the outer portion of the seal, this normally wasted leaking air is bled off through a suitable conduit arrangement and fed to an inlet line 5 for ejector 6 as shown in FIG. 1, or to an inlet line for an air turbine such as shown at 8 in FIG. 2. This bleed off system of FIG. 3 may be combined with those of FIGS. 1 and 2 if desired to further improve the efficiency of the turbo-machine. Thus the invention can use the compressor leakage air either as primary air in a jetpump or to drive a compressor which thus pumps the subatmospheric air out from the diffusor. The predicted improvement in exhaust diffusor performance is large enough such that in addition to make up for the lost air there is a net improvement in power output and thermal efficiency.

According to the preceding description the working medium is air and combustion gases respectively, since the invention is illustrated in connection with turbo-chargers and turboshaft engines. However, a corresponding effect may be obtained in connection with other fluids, including liquids. The use of other working mediums, especially vapour and other gases, is therefore within the scope of the invention.

What I claim is:

1. In a turbo-machine such as a turbo-charger or a gas turbine engine having a compressor assembly including a compressor diffuser and a labyrinth seal, and a turbine assembly including an exhaust gas diffuser, the improvement comprising an energy conversion means which is operated by a working medium bled from said compressor and supplies energy for removing working medium by suction from a boundary layer or vortex flow in the turbine exhaust diffuser, said energy conversion means comprising a first conduit connected at one end to said labyrinth seal to bleed off gas leaking therethrough at a first pressure and connected at the other end to a pump means to feed said bled gas to said pump means to operate said pump means, and a second conduit connected at one end to the suction line of said pump means and connected at the other end to said boundary layer or vortex flow of said turbine exhaust diffuser.

2. The turbo-machine as claimed in claim 1 wherein said pump means comprises a jet ejector pump.

3. In a method of stabilizing the flow of a working medium in a gas turbine engine having a compressor with a compressor diffuser and a turbine with an exhaust gas diffuser, said turbine driving said compressor by a common shaft, and a labyrinth seal adjacent the juncture of the compressor and compressor diffuser through which gas from the exit of the compressor leaks, the working medium being at a working pressure in said labyrinth seal and at a lower pressure in a boundary layer or vortex region of said exhaust diffuser, the improvement whereby the total efficiency of the engine is improved comprising, bleeding off a part of the working medium from said labyrinth seal, bleeding off a part of the working medium from the boundary layer or vortex region of said turbine exhaust diffuser, and coupling said bleedoffs by feeding said working fluid bled from said labyrinth seal to a pump to operate the pump thereby, and connecting the suction line of the pump to the boundary layer or vortex region of said turbine exhaust diffuser.

4. The method of claim 3 wherein said pump is a jet ejector, and bleeding off said working fluid from said exhaust gas diffuser comprises connecting the suction inlet of said jet ejector to the boundary layer or vortex region of said turbine exhaust diffuser.

5. In a method of stabilizing the flow of a working medium in a gas turbine engine having a compressor with a compressor diffuser and a turbine with an exhaust gas diffuser, said turbine driving said compressor by a common shaft, and a labyrinth seal adjacent the juncture of the compressor and compressor diffuser through which gas from the exit of the compressor leaks, the working medium being at a working pressure in said labyrinth seal and at a lower pressure in a boundary layer or vortex region of said exhaust diffuser, the improvement whereby the total efficiency of the engine is improved comprising, bleeding off a part of the working medium from said labyrinth seal, bleeding off a part of the working medium from the boundary layer or vortex region of said turbine exhaust diffuser, and coupling said bleedoffs by feeding said working fluid bled from said labyrinth seal to an auxiliary gas turbine to drive said auxiliary turbine thereby, driving an auxiliary pump by said auxiliary turbine, and connecting the suction line of said auxiliary pump to the boundary layer or vortex region of said turbine exhaust diffuser.

6. In a turbo-machine such as a turbo-charger or a gas turbine engine having a compressor assembly including a compressor diffuser and a labyrinth seal, and a turbine assembly including an exhaust gas diffuser, the improvement wherein an energy conversion means is operated by a working medium bled from said compressor and supplies energy for removing working medium by suction from a boundary layer or vortex flow region in the turbine exhaust diffuser, said energy conversion means comprising an auxiliary gas turbine and pump assembly, said auxiliary turbine and pump being operably connected so that said turbine drives said pump, a first conduit connected at one end to said labyrinth seal and connected at the other end to an inlet of said auxiliary turbine to bleed off gas leaking through said labyrinth seal at a first pressure and feed it to said auxiliary turbine to drive said auxiliary turbine, and a second conduit connected at one end to a suction line of said auxiliary pump and connected at the other end to said boundary layer or vortex flow region of said turbine exhaust diffuser.

* * * * *